United States Patent
Sahota et al.

(10) Patent No.: US 11,645,288 B2
(45) Date of Patent: May 9, 2023

(54) REASSIGNING GAMER CLUSTERS BASED ON ENGAGEMENT

(71) Applicant: International Business Machines Corporation, Armonk, NY (US)

(72) Inventors: Neil Sahota, Costa Mesa, CA (US); Joseph Kozhaya, Morrisville, NC (US); Phaedra Boinodiris, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 15/802,595

(22) Filed: Nov. 3, 2017

(65) Prior Publication Data

US 2019/0138636 A1    May 9, 2019

(51) Int. Cl.
| | | |
|---|---|---|
| *G06F 16/2457* | (2019.01) | |
| *H04L 67/306* | (2022.01) | |
| *G06F 17/18* | (2006.01) | |
| *G06F 16/28* | (2019.01) | |
| *G06F 16/435* | (2019.01) | |
| *H04L 67/10* | (2022.01) | |
| *H04L 67/131* | (2022.01) | |
| *G06Q 50/00* | (2012.01) | |

(52) U.S. Cl.
CPC ...... *G06F 16/24575* (2019.01); *G06F 16/285* (2019.01); *G06F 16/437* (2019.01); *G06F 17/18* (2013.01); *H04L 67/10* (2013.01); *H04L 67/131* (2022.05); *H04L 67/306* (2013.01); *G06Q 50/01* (2013.01)

(58) Field of Classification Search
CPC ............. G06F 16/24575; G06F 16/285; G06F 16/437; G06Q 50/01

USPC .......................................... 707/738
See application file for complete search history.

(56) References Cited

U.S. PATENT DOCUMENTS

| | | | | |
|---|---|---|---|---|
| 7,422,521 B2* | 9/2008 | Peterson | ................. | G07F 17/32 |
| | | | | 463/43 |
| 8,578,285 B2* | 11/2013 | Wetzer | ...................... | G06F 9/54 |
| | | | | 715/764 |
| 8,834,246 B1* | 9/2014 | Bhartia | ................. | A63F 13/822 |
| | | | | 463/9 |
| 9,104,997 B1* | 8/2015 | Balasubramanian | .. | G06Q 10/06 |
| 10,268,767 B2* | 4/2019 | Byrne | ................... | H04L 67/306 |

(Continued)

OTHER PUBLICATIONS

Mell et al., "The NIST Definition of Cloud Computing," Recommendations of the National Institute of Standards and Technology, US Department of Commerce, Special Publication 800-145, Sep. 2011, 7 pages.

*Primary Examiner* — Ashish Thomas
*Assistant Examiner* — Nargis Sultana
(74) *Attorney, Agent, or Firm* — Jared C. Chaney

(57) ABSTRACT

The present invention provides a method, computer program product, and system of performing personality profile automated measurements. In an embodiment, the method, computer program product, and system includes receiving, by a computer system, gaming history data associated with a gamer profile, assigning, by the computer system, the gamer profile to a first cluster of gamers, recording, by the computer system, game play data associated with the gamer profile, and based on the game play data associated with the gamer profile and the gaming history data associated with the gamer profile, reassigning the gamer profile into a second cluster of gamers.

19 Claims, 12 Drawing Sheets

(56) References Cited

U.S. PATENT DOCUMENTS

| | | | |
|---|---|---|---|
| 10,536,542 B1* | 1/2020 | Dorner | H04L 51/52 |
| 2002/0128908 A1* | 9/2002 | Levin | G06Q 30/0269 |
| | | | 705/14.66 |
| 2003/0048415 A1* | 3/2003 | Echigo | G06T 7/20 |
| | | | 352/38 |
| 2007/0208834 A1* | 9/2007 | Nanamura | G06Q 10/10 |
| | | | 709/217 |
| 2010/0306163 A1* | 12/2010 | Beaty | G06F 11/301 |
| | | | 718/1 |
| 2011/0288970 A1* | 11/2011 | Kidron | G06Q 40/12 |
| | | | 709/219 |
| 2012/0258795 A1* | 10/2012 | Ryan | G07F 17/3206 |
| | | | 463/29 |
| 2013/0055226 A1* | 2/2013 | Hayashizaki | G06F 11/3612 |
| | | | 717/158 |
| 2013/0191394 A1* | 7/2013 | Bradley | G06Q 50/01 |
| | | | 707/738 |
| 2013/0344968 A1* | 12/2013 | Halfteck | A63F 13/79 |
| | | | 463/43 |
| 2014/0011595 A1* | 1/2014 | Muller | A63F 13/35 |
| | | | 463/42 |
| 2014/0108310 A1* | 4/2014 | Baughman | G06N 20/10 |
| | | | 706/12 |
| 2014/0278308 A1* | 9/2014 | Liu | G06F 16/958 |
| | | | 703/6 |
| 2014/0335963 A1* | 11/2014 | Wolters | A63F 13/12 |
| | | | 463/42 |
| 2015/0195315 A1* | 7/2015 | Kidron | H04L 65/612 |
| | | | 709/219 |
| 2017/0039253 A1* | 2/2017 | Bond | G06F 16/9024 |
| 2017/0244770 A1* | 8/2017 | Eckerdal | G06F 16/639 |
| 2017/0300552 A1* | 10/2017 | Mandadi | G06F 16/273 |
| 2019/0347244 A1* | 11/2019 | Jacob | G06F 21/6227 |

* cited by examiner

REASSIGNING GAMER CLUSTERS BASED ON ENGAGEMENT

BACKGROUND

The present disclosure relates to profile assignment, and more specifically, to performing personality profile automated measurements.

SUMMARY

The present invention provides a method, computer program product, and system of performing personality profile automated measurements. In an embodiment, the method, computer program product, and system includes receiving, by a computer system, gaming history data associated with a gamer profile, assigning, by the computer system, the gamer profile to a first cluster of gamers, recording, by the computer system, game play data associated with the gamer profile, and based on the game play data associated with the gamer profile and the gaming history data associated with the gamer profile, reassigning the gamer profile into a second cluster of gamers.

In a further embodiment, the method, computer program product, and system further includes receiving, by the computer system, gaming history data associated with one or more gamer profiles assigned to the first cluster of gamers, based on the game play data associated with the one or more gamer profiles assigned to the first cluster, selecting, by the computer system, an initial gaming module among a plurality of initial gaming modules, recording, by the computer system, game play data associated with the one or more gamer profiles, based on the game play data associated with the one or more gamer profiles and the gaming history data associated with the one or more gamer profiles assigned to the first cluster, identifying, by the computer system, one or more candidate game modules, and displaying, by the computer system, choices of a plurality of the one or more candidate modules to one or more gamers associated with the one or more gamer profiles assigned to the first cluster on a display logically connected to the computer system.

DETAILED DESCRIPTION

Figure 1:
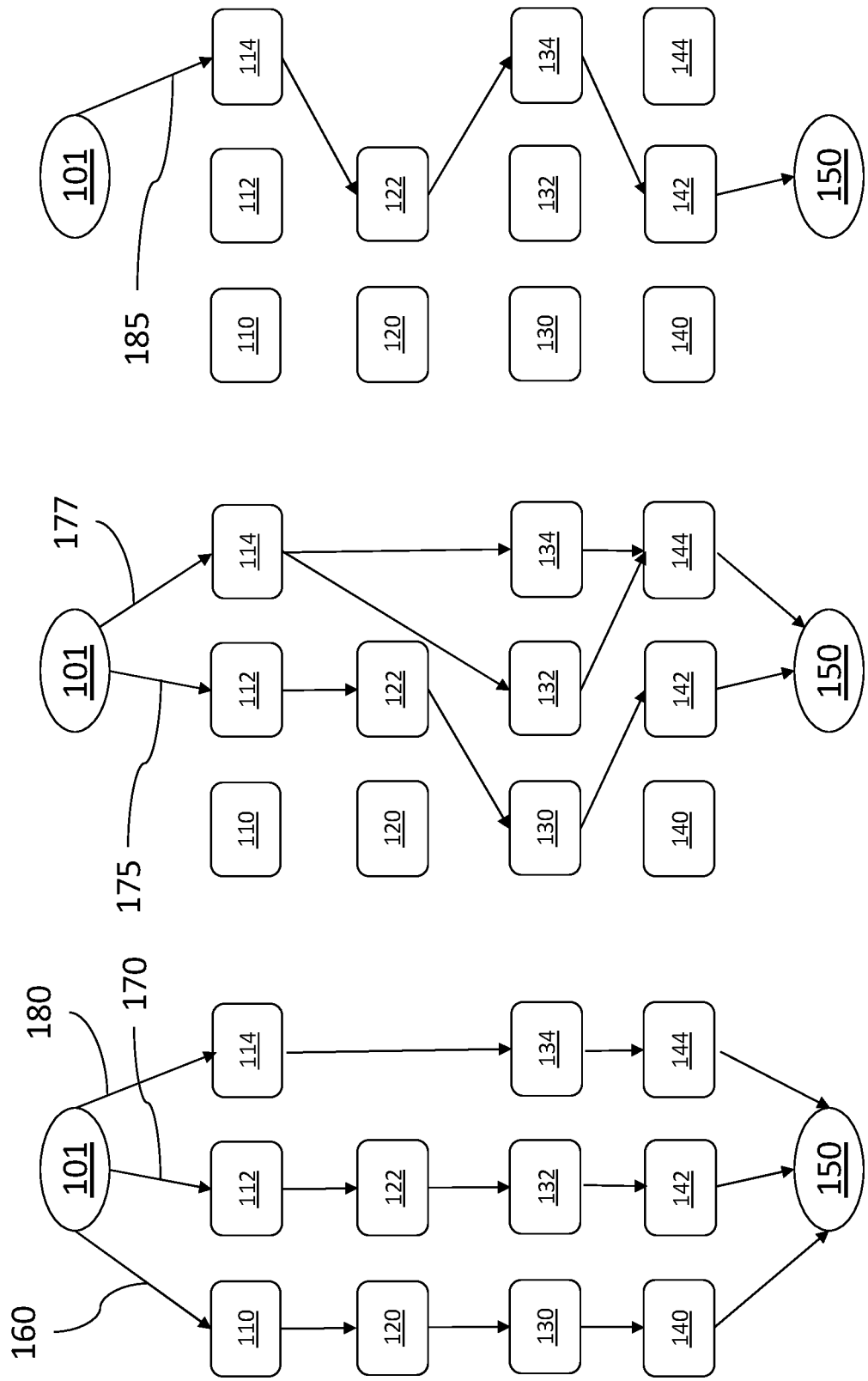
FIG. 1A depicts a block diagram in accordance with an exemplary embodiment of the present invention.
FIG. 1B depicts a block diagram in accordance with an exemplary embodiment of the present invention.
FIG. 1C depicts a block diagram in accordance with an exemplary embodiment of the present invention.

The present invention provides a method, computer program product, and system of performing personality profile automated measurements. In an embodiment, the method, computer program product, and system includes receiving, by a computer system, gaming history data associated with a gamer profile, assigning, by the computer system, the gamer profile to a first cluster of gamers, recording, by the computer system, game play data associated with the gamer profile, and based on the game play data associated with the gamer profile and the gaming history data associated with the gamer profile, reassigning the gamer profile into a second cluster of gamers.

In a further embodiment, the method, computer program product, and system further includes receiving, by the computer system, gaming history data associated with one or more gamer profiles assigned to the first cluster of gamers, based on the game play data associated with the one or more gamer profiles assigned to the first cluster, selecting, by the computer system, an initial gaming module among a plurality of initial gaming modules, recording, by the computer system, game play data associated with the one or more gamer profiles, based on the game play data associated with the one or more gamer profiles and the gaming history data associated with the one or more gamer profiles assigned to the first cluster, identifying, by the computer system, one or more candidate game modules, and displaying, by the computer system, choices of a plurality of the one or more candidate modules to one or more gamers associated with the one or more gamer profiles assigned to the first cluster on a display logically connected to the computer system.

Today, an issue with programs (games, applications, etc.) is that users can be "assumption locked." That is, once an organization has made assumptions about a group of users/consumers, the only validation check becomes actual usage or sales. There is no dynamic checking of choices and interaction of the user. So, if a false assumption of a user is made, or a user is put into an incorrect class of users, that mistake may be propagated throughout the user's entire interaction with the program.

In an embodiment, personality profile automated measurements (P-PAM) captures user experiences in one or more environments (applications, games, etc.) and use the captured experiences to validate, dynamically, a user's profile (personality or any other metric of interest) by comparing his/her execution and interest in various design modules against those of assigned modules for different user clusters.

In an embodiment, P-PAM dynamically validates profiles (such as personality profiles) through the user's engagement with the product or service. In an embodiment, P-Pam provides 1) real-time validation of user/consumer assumptions, 2) capability to see how target markets are changing over time, and 3) real time adjusting product/service mix to meet changing customer needs. In an embodiment, P-PAM can be applied to any application, program, or game to improve user engagement.

In an embodiment, the target audience of user for the game or application is broken up into groups or clusters of users. In an embodiment, there are a number of users that constitute a representative sample for the game or application audience.

In an embodiment, games or applications will include design modules (e.g., modules, environments, errands, responsibilities, tasks, and/or activities). In an embodiment, a game or application consists of a number of modules a user has to go through. For example, there could be one or more of such design modules for the game or application being designed. Each design module could possibly have one or more of possible variations (either different designs or different approaches to achieve a task). In an embodiment, a candidate game module means a game module variation or a game module as described herein.

In an embodiment, the history of game play or history of application use is recorded. In an embodiment, the history of individual user choices or the history of a cluster of users is recorded. For example, a history of game play from one or more other games that one or more players or one or more user clusters were involved in are recorded. In an embodiment, the system references enabling art which monitors players in a game, suggests variations to game mechanics based on a player's profile (e.g., psychosocial profile), tracks a player's response, and/or suggests further variations. For example, a player had a better experience executing a task using a variation 3 as opposed to variations 1 and 2. In an embodiment, P-PAM presenting modules to a user includes assigning gaming tasks to the gamer profile based on the assigning.

Process to Create Profile-Driven User Experience Tree Based on Historical Play:

In an embodiment, the system creates a profile (for example a psychosocial profile) for one or more users by using one or more existing solutions (e.g. known history of choices, preferences, engagement, etc.). In an embodiment, one or more users are clustered into different groups of similar personality profiles (for example, big 5 traits are within a specified delta). In an embodiment, for each cluster $C_m$ of players, the system identifies the top $1_m$ design modules (or tasks) that group found most engaging. In an embodiment, the system uses the information collected to determine how personality traits correlate to certain design modules or tasks.

In an embodiment, for each cluster of players and design module, the system will identify the top variations of a task which the players found most engaging based on their history of game play. In an embodiment, top variations refer to variations that most closely match the player's profiles. In an embodiment, the system provides ranked variations for a design module to suggest to a group of certain personality and validates the module selections by the one or more user's history of application use or game play.

In an embodiment, P-PAM includes displaying choices of the plurality of initial gaming modules on a display logically connected to the computer system, and receiving a selection of the initial gaming module from the choices of the plurality of initial gaming modules. For example, P-PAM could give a user a choice between initial gaming modules of good and evil or wizard and paladin. These choices could be given without any analysis and the users could be clustered based on the profiles with the user profiles and the cluster profiles reflecting those choices. In an embodiment, P-PAM could detect when the selected path on subsequent choices differs or when the user satisfaction or engagement is low. For example, a user could have selected a paladin module but demonstrates a higher satisfaction when using magic (or other wizard skills). P-PAM could subsequently direct the user to wizard based module variations in the future. In an embodiment, P-PAM includes receiving, by the computer system, a choice of one of the one or more candidate gaming modules.

Referring to FIGS. 1A, 1B, and 1C, in an embodiment, P-PAM creates a multi-level tree where each level consists of one design module and all possible variations. In an embodiment, P-PAM defines a start node 101 that feeds into first design module with its variants 110, 112, and 114; second design module with its variants 120 and 122; third design module with its variants 130, 132, 134; and a target node 150 that terminates the last design module with its variants 140, 142, and 144. In an embodiment, the system populates the modules in the tree with weights based on the profile based clusters and the number of players in each cluster that found a design module engaging. For example, for a first user cluster, from start node 101 the first design module could have variation 110 with weight 70%, variation 112 with 20%, and variation 114 with 10%. This means that each user in a first cluster of users has a predicted 70% chance of choosing variation 110, a 20% chance of choosing variation 112, and a 10% chance of choosing variation 114. In an embodiment, different user clusters could have different weighing for the different modules. For example, where a first cluster of users could have variation 110 with weight 70%, a second cluster of users could have variation 110 with weight 30%. In an embodiment, the prediction is based on which variations the players will find engaging instead of which they will choose. In an embodiment, the predictions are based on which variations the players will choose and which they will like the most.

In an embodiment, each module does not have to have a fixed number of variations. For example, the first module has three variations (110, 112, and 114), and the second module has 2 variations (120 and 122). In an embodiment, any module could have any number of variations. For example, the first module could have one, two, or five variations. In an embodiment, P-PAM covers any number of modules. For example, FIGS. 1A, 1B, and 1C show four modules, but they could have had one, two, twenty, or a different number of modules.

In an embodiment, the actual choices of a user can be used to adjust the placement of a user in a cluster. In an embodiment, a predicted path means the most likely path for a user in a user cluster, but as explained below, users have the option of choosing any module variation open to them. Predicted paths are depicted in FIGS. 1A, 1B, and 1C for exemplary purposes and not intended to imply users must follow the predicted paths. For example, in FIG. 1A, path 160 shows the most likely predicted path of the users for a first cluster, path 170 shows the most likely predicted path of the users for a second cluster, and path 180 shows the most likely predicted path of the users for a third cluster. Referring to FIG. 1B, when a user is initially placed in the first cluster, but the user's actual path 175 tracks more closely with the second cluster. The user could be reassigned to the second cluster. In an embodiment, a user's variation choices could not fit closely with any cluster and a new cluster would need to be defined. For example, a user's choices take the user down path 185. Path 185 does not match closely with the second clusters (path 170) or the third cluster (path 180). A fourth cluster could be defined with parameters that would predict path 185. In an embodiment, the user choices is game or application data (e.g., game play data). For example, if a user fires a sidearm more than a rifle. In an embodiment, the game play data describes gaming preferences of the gamer profile.

In an embodiment, each path does not have to be assigned the same number of modules. For example, variation 114 of module one could cause the user to skip over the second module. In further example, in a game, choosing not to save the princess from the dragon could have the user skip fighting the dragon.

In an embodiment, predicted user cluster paths do not have to be linear, they are shown as such for clarity purposes in FIG. 1A. Predicted paths will match the profile of the player cluster. In an embodiment, a small deviation from a predicted path will not necessarily mean that a user has been placed in the wrong user cluster. For example, 180 is the most likely predicted path for the second cluster of users. During game play or application use the player chooses module three variation 130, but otherwise follows the predicted path. The small deviation (choosing module variation 130 instead of module variation 132), does not necessarily mean the user needs to be assigned to a different cluster or have a new user cluster defined for the user. In an embodiment, a predicted path could have a module with two variations that are equally as likely. For example, a user cluster could have path 177 and could have a predicted path of variation 132 (45%), variation 134 (46%), and variation 130 (9%) for module three. Variation 132 and 134 have essentially the same likelihood of being chosen by a user in the user cluster and thus either one could be considered the predicted path.

In an embodiment, P-PAM does not give a choice of variations. For example, P-PAM judges the user's engagement or satisfaction with the variation of each module to determine which cluster the user should be placed in. For example, a player could be initially placed in the first user cluster. If the user likes the module variation, P-PAM will keep the user in the same cluster. If the player does not like the module variation, P-PAM will change the user to a different user cluster. In an embodiment, engagement or satisfaction is determined with any feedback means necessary as game play or application use continues (e.g., continuing to use the application or game, a long break from use of the application or game, a feedback mechanism, dialog with other users or players).

In an embodiment, P-PAM has a choice of modules or module trees to present each cluster based on the cluster profile. For example, a first cluster and a second cluster might be rogues and need be presented rogue modules, while a third cluster might be a barbarian and need to be presented barbarian modules. The variations within the rogue module might have a good set of alignment variations for the first cluster and an evil set of alignment variations for the second cluster.

In an embodiment, development of the tree is repeated for all design modules, the variations for each such module, and for all player clusters.

In an embodiment, once a tree is created, P-PAM traverses through the tree to identify the best combination of design modules and their variations to leverage in building an engaging experience for the players of a given cluster.

Figure 2:
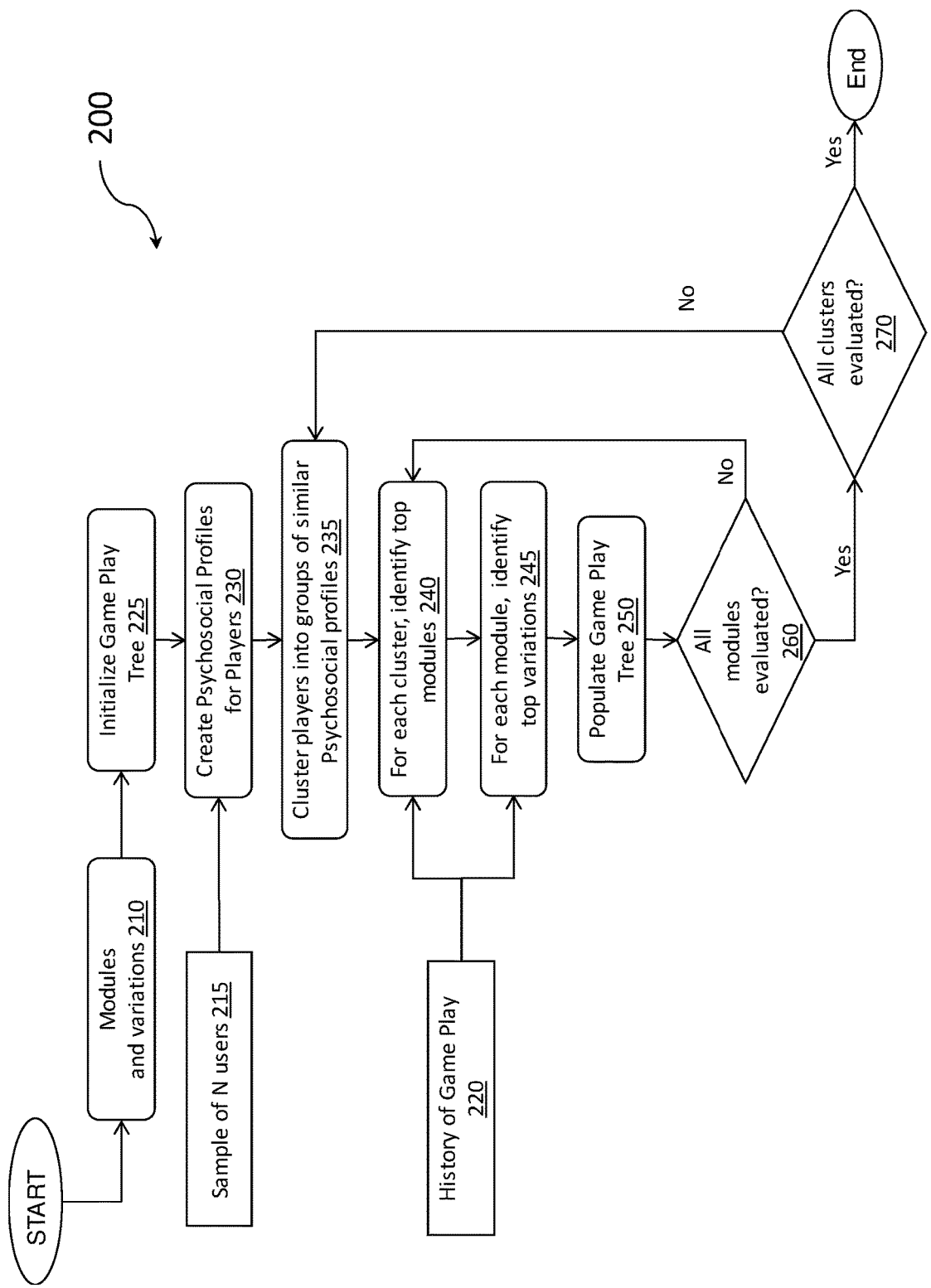
FIG. 2 depicts a flow diagram in accordance with an exemplary embodiment of the present invention.

Referring to FIG. 2, in an embodiment, the method 200 includes an operation 210 of receiving information on a set of modules and variations, an operation 215 of receiving information for a sample of N users (where N is a number of users), and an operation 220 of receiving a history of the N users. In an embodiment, the system then uses the information to make profiles for the users, identify modules for the users, and populate usage trees for the users. For example, in a game, the system could perform an operation 225 of initializing a game play tree by taking modules and variations 210 and organizing the modules into the game tree, such as the tree shown in FIG. 1, with the modules and variations. The system could perform an operation 230 of creating psychosocial profiles for players of the game based on receiving information for the sample of N users at 215. The system could perform an operation 235 clustering the players into groups of players with similar psychosocial profiles. Based on the clustering operation 235, receiving operation 210, and receiving operation 215 the system could perform an operation 240 of identifying the top modules for each cluster. Based on operation 220 and operation 240, the method includes an operation 245 of identifying the top variation for each module for each cluster. Based on operation 245, the game play tree is populated with the modules. In an embodiment, the population organizing the modules and their variations in the game play tree by the determinations of operation 240 and operation 245. In an embodiment, an operation 260 of checking to see if all modules are evaluated. For example, if all modules have not been evaluated, then operation 240, operation 245, and/or operation 250 could be repeated. In an embodiment, operation 270 of checking to see if all cluster placements have been evaluated. For example, if a particular user's module selection does not match the rest of the group, the placement of the particular user could be reevaluated such that the user is placed in a different cluster.

Figure 3:
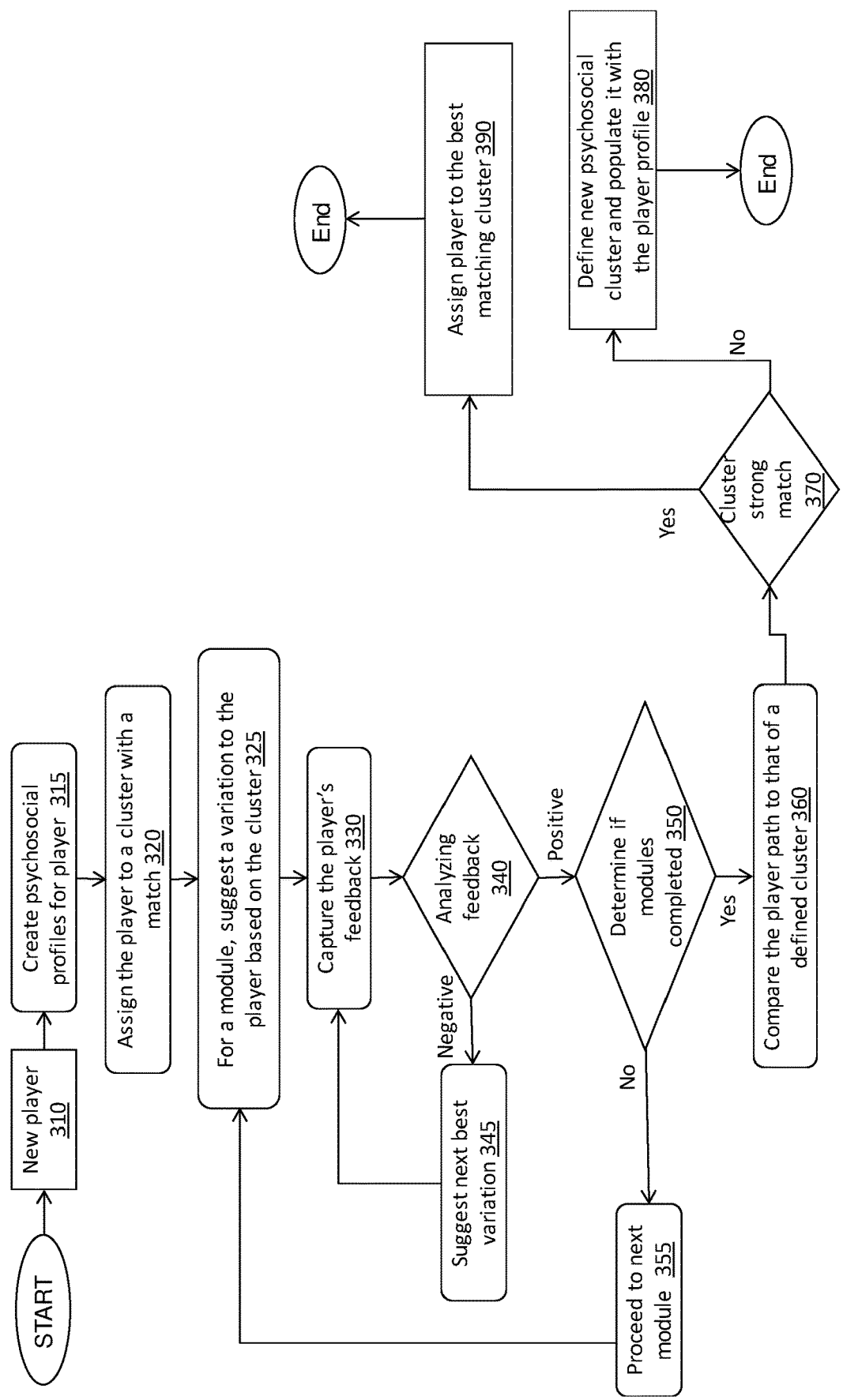
FIG. 3 depicts a flow diagram in accordance with an exemplary embodiment of the present invention.

Referring to FIG. 3, in an embodiment, the method 300 includes an operation 310 of receiving information on a new player profile and an operation 315 of creating a psychosocial profile for the player. The method further includes an operation 320 of assigning the player to a cluster based on the player's psychosocial profile and an operation 325 of suggesting a module variation to the player for one or more modules based on the cluster. The method includes an operation 330 of capturing the players' feedback, an operation 340 of analyzing the feedback. In an embodiment, for negative or not positive feedback the method includes operation 245 of suggesting the next best variation for the module. In an embodiment, for positive or not negative feedback, the method includes operation 350 of determining if a set of modules have been completed. In an embodiment, for a determination that the set of the modules have not been completed, the method includes operation 355 of proceeding to the next module and a repeat of one or more of operation 325, operation 330, operation 340, operation 345, and operation 350. In an embodiment, for a determination that the set of the modules have been completed, the method includes an operation 360 of comparing the player path to that of a defined cluster. In an embodiment, the set of modules can be defined by points in which P-PAM is to determine user cluster placement. In an embodiment, the defined cluster is a cluster that has previously been defined (i.e. created or determined). In an embodiment, there may be one or more defined clusters. In an embodiment, the method includes an operation 370 of determining if the defined cluster is a strong match for the user based on comparison operation 360. In an embodiment, a strong cluster match is a high degree of correlation with the predicted choices for the cluster. For example, a correlation of 90% or more. In an embodiment, for strong cluster match, the player is assigned to the best matching cluster (i.e., the defined cluster) in operation 390. In an embodiment, the method includes an operation 380 of defining a second cluster and assigning the gamer profile to the second cluster. In an embodiment, the assigning is based on a determination that there is not a defined cluster that is a strong match.

Figure 4:
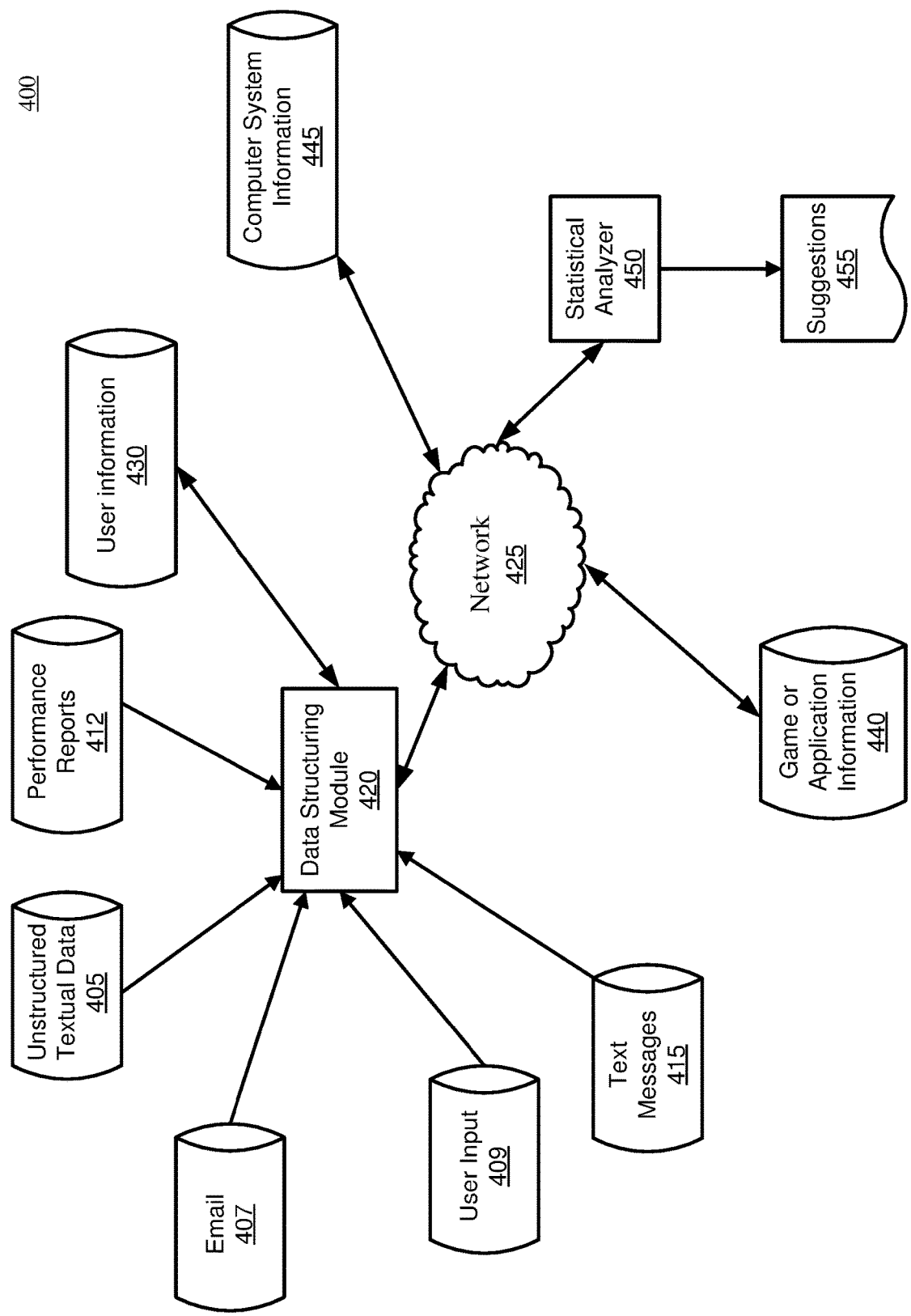
FIG. 4 depicts a block diagram in accordance with an exemplary embodiment of the present invention.

In an embodiment, referring to FIG. 4, an example network environment 400 includes a plurality of data sources, such as a source of unstructured textual data 405, performance reports 412, user input 409, emails 407, text messages 415, user information 430, game or application information 440, and computer system information 445. In an embodiment, the data sources (e.g., unstructured textual data 405, performance reports 412, user input 409, emails 407, text messages 415, user information 430, game or application information 440, and computer system information 445) resides in the storage of a single device, or is distributed across the storage of a plurality of devices. Data collected from the data sources includes historical data (e.g., data corresponding to previous module selections). In an embodiment, a single type of data (e.g., game or application information 440) resides in the storage of a single device, or resides in the storage of several devices connected either locally or remotely via a network, such as a network 425. In an embodiment, the data sources and other devices connected to network 425 are local to each other, and communicate via any appropriate local communication medium.

In an embodiment, data structuring module 420 includes, or is a part of, a device for converting unstructured, raw data (e.g., textual data, images, videos, sound recordings, etc.) into structured data (e.g., machine-readable data) that a computer system utilizes. For example, unstructured data could include recorded game play video, recorded gamer chat, and/or text based messages from players/users.

In an embodiment, user information 430 includes data relevant to the skill of a user. For example, user information 430 could be a self-assessment of game skill, education, duration of the user's game play experience, relevant experience, experience with the game or application in question.

In an embodiment, game or application information 440 includes any data regarding the game or application. For example, game or application information 440 includes module information for a particular game, gaming system information, application information, type of game information, genera of game information, type of application information, genera of application information, and/or general game/application information.

In an embodiment, computer system information 445 includes data collected from or about the computer system (e.g., gaming console, mobile device, or computer). For example, computer system information could include specifications for the computer system or manuals about the computer system.

In an embodiment, the various data sources, the data structuring module 420 and a statistical analyzer 450 are connected via network 425. The network 425 can be implemented using any number of any suitable communications media. For example, the network 425 could be a wide area network (WAN), a local area network (LAN), an internet, or an intranet. For example, the data structuring module 420 and statistical analyzer 450 and one or more data sources could communicate using a local area network (LAN), one or more hardwire connections, a wireless link or router, or an intranet. In an embodiment, the data structuring module 420, statistical analyzer 450, and/or one or more data sources are communicatively coupled using a combination of one or more networks and/or one or more local connections. For example, the data structuring module 420 is hardwired to the statistical analyzer 450 (e.g., connected with an Ethernet cable) while the data sources could communicate with the data structuring module 420 and statistical analyzer 450 using the network 425 (e.g., over the Internet).

In an embodiment, the network 425 can be implemented within a cloud computing environment, or using one or more cloud computing services. Consistent with various embodiments, a cloud computing environment includes a network-based, distributed data processing system that provides one or more cloud computing services. Further, a cloud computing environment includes many computers (e.g., hundreds or thousands of computers or more) located within one or more data centers and configured to share resources over the network 425.

In an embodiment, data structuring module 420 and/or statistical analyzer 450 employs "crawlers" or "scrapers" to access the various data sources to mine relevant data at particular intervals, or in real-time. Crawlers/scrapers are configured to "patrol" in search of relevant data (e.g., unstructured textual data 405, performance reports 412, user input 409, emails 407, text messages 415, user information 430, game or application information 440, computer system information 445, etc.) in the data sources, such as performance reports 412, user input 409, emails 407, text messages 415, user information 430, game or application information 440, and computer system information 445. For example, a crawler is configured to identify and retrieve information on the servicing issue, to identify and retrieve information on the computer system, to identify and retrieve user records for a particular demographic or a particular individual, etc. In an embodiment, a crawler is configured to "crawl" through a database or data source at a given interval, and/or to retrieve documents that have been updated or modified subsequent to a previous retrieval. A document fitting the crawler's parameters is retrieved, and if needed, analyzed and converted from an unstructured state into a structured state via data structuring module 420.

In an embodiment, structured data is said to contain sets of features (e.g., events, preceding, attributes, characteristics, etc.) of the game/application or user interaction/performance in the game/application. The data from each data source is said to contain a single feature set. For example, the data from the source containing performance reports is a first feature set, the data from the source containing computer system information 445 is a second feature set, and so on. Once the feature set from each available data source is collected, it is combined to create a complete feature set.

In an embodiment, a complete feature set (e.g., a set of all features related to a game/application, computer system, or user skill level) is utilized by statistical analyzer 450, using the methods described herein (e.g., k-means clustering), to determine correlations between features (e.g., characteristics, user skill level, technical requirements, etc.) of a particular module (e.g., requirement, malfunctioning components, etc.) and possible solutions. For example, statistical analyzer 450 could identify that a particular module or module variation is too difficult for a cluster of players. Possible solutions could include directing the cluster to a new module variation, lowering the difficulty of the module or module variation, etc. In an embodiment, k-means clustering aims to partition n observations into k clusters in which each observation belongs to the cluster with the nearest mean, serving as a prototype of the cluster.

In an embodiment, statistical analyzer 450 generates suggestions 455 for modules. In an embodiment, suggestions 455 are generated by considering all data relevant to the game or user profile (e.g., a plurality of complete feature sets) that correlate to game play experience. Particular features within the suggestions 455 are weighted. For example, an evil alignment module or variation could be weighted highly for a user that normally makes evil alignment choices in a game and the module or variation might not be weighted highly for a user that normally makes good alignment choices. In one example, for a cluster with barbarian avatars, the confidence value for a variation with a lot of melee combat could be 90% and a variation with lots of ranged combat could have a confidence value of 10%.

Figure 5:
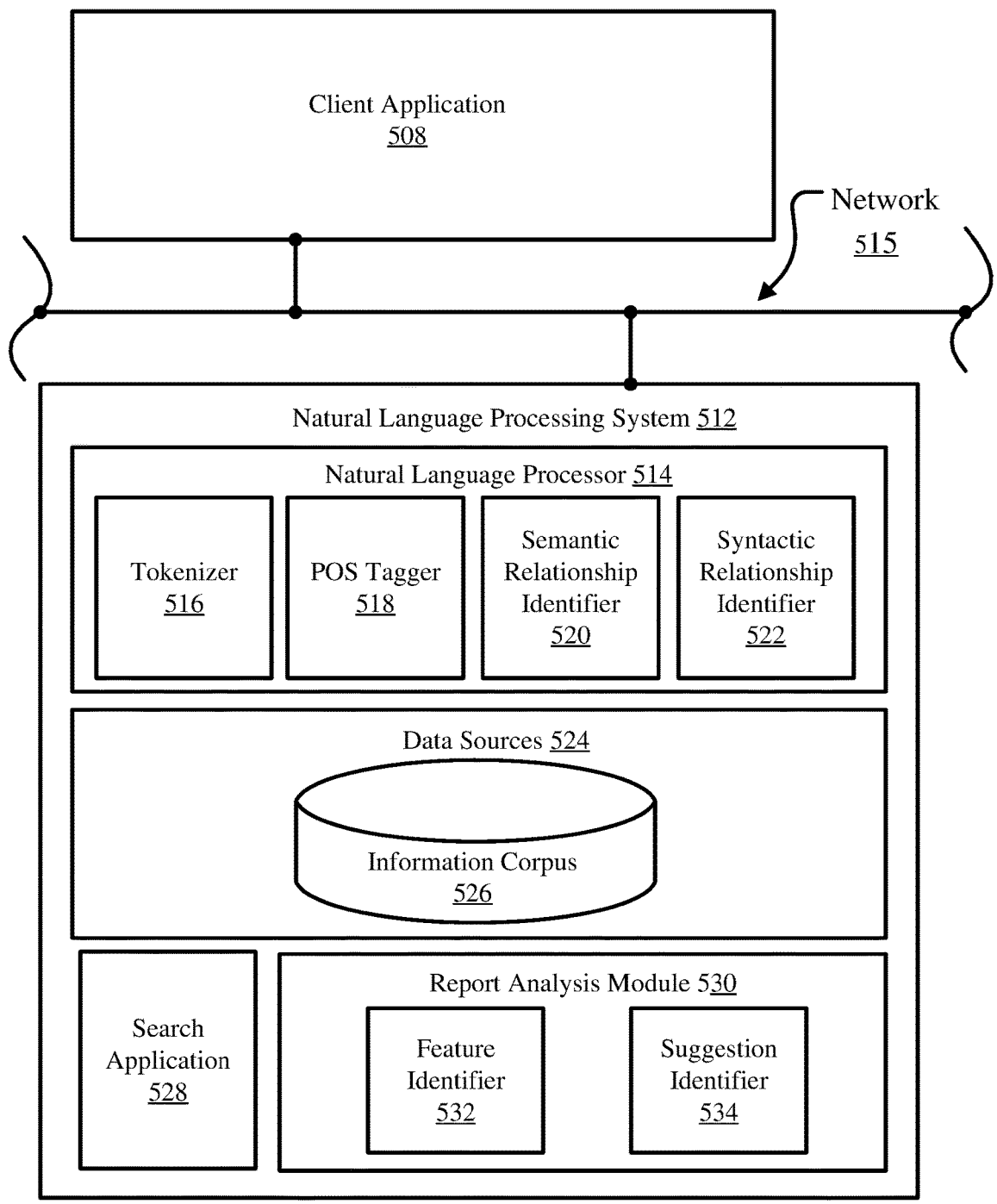
FIG. 5 depicts a block diagram in accordance with an exemplary embodiment of the present invention.

Referring to FIG. 5, in an embodiment, illustrated is a block diagram of an example natural language processing system configured to analyze error data, user skill information, or any other report with unstructured textual data, in accordance with embodiments of the present disclosure. In an embodiment, a remote device (such as a device containing one or more of the data sources described in FIG. 4) submits electronic documents (such as textual performance reports, or other unstructured textual reports) to be analyzed to a natural language processing system 512 which is a standalone device, or part of a larger computer system. In an embodiment, natural language processing system 512 includes a client application 508, which itself involves one or more entities operable to generate or modify information in the unstructured textual report(s) that is then dispatched to natural language processing system 512 via a network 515, which in some embodiments is consistent with network 425.

In an embodiment, natural language processing system 512 responds to electronic document submissions sent by client application 508.

Likewise, in an embodiment, natural language processing system 512 analyzes a received unstructured textual report relating to the user skill level. If a user skill level is not provided to client application 508, a skill of a user could be determined using natural language processing system 512 to analyze information relating to the user's technical skill. For example, natural language processing system 512 could analyze a received unstructured textual report including the user's education, game play experience, application use experience, etc. to determine a relative skill level.

In an embodiment, natural language processing system 512 includes a natural language processor 514, data sources 524, a search application 528, and a report analysis module 530. Natural language processor 514 is a computer module that analyzes the received unstructured textual reports and other electronic documents. In an embodiment, natural language processor 514 performs various methods and techniques for analyzing electronic documents (e.g., syntactic analysis, semantic analysis, etc.). Natural language processor 514 is configured to recognize and analyze any number of natural languages. In an embodiment, natural language processor 514 parses passages of the documents. Further, natural language processor 514 includes various modules to perform analyses of electronic documents. These modules include, but are not limited to, a tokenizer 516, a part-of-speech (POS) tagger 518, a semantic relationship identifier 520, and a syntactic relationship identifier 522.

In an embodiment, tokenizer 516 is a computer module that performs lexical analysis. In an embodiment, tokenizer 516 converts a sequence of characters into a sequence of tokens. A token is a string of characters included in an electronic document and categorized as a meaningful symbol. Further, in an embodiment, tokenizer 516 identifies word boundaries in an electronic document and breaks any text passages within the document into their component text elements, such as words, multiword tokens, numbers, and punctuation marks. In an embodiment, tokenizer 516 receives a string of characters, identify the lexemes in the string, and categorizes them into tokens.

In an embodiment, POS tagger 518 is a computer module that marks up a word in passages to correspond to a particular part of speech. In an embodiment, POS tagger 518 reads a passage or other text in natural language and assigns a part of speech to each word or other token. In an embodiment, POS tagger 518 determines the part of speech to which a word (or other text element) corresponds, based on the definition of the word and the context of the word. The context of a word is based on its relationship with adjacent and related words in a phrase, sentence, or paragraph. In an embodiment, the context of a word is dependent on one or more previously analyzed electronic documents. In an embodiment, the output of natural language processing system 512 populates a text index, a triple store, or a relational database to enhance the contextual interpretation of a word or term. Examples of parts of speech that is assigned to words include, but are not limited to, nouns, verbs, adjectives, adverbs, and the like. Examples of other part of speech categories that POS tagger 518 could assign include, but are not limited to, comparative or superlative adverbs, wh-adverbs, conjunctions, determiners, negative particles, possessive markers, prepositions, wh-pronouns, and the like. In an embodiment, POS tagger 418 tags or otherwise annotates tokens of a passage with part of speech categories. In an embodiment, POS tagger 518 tags tokens or words of a passage to be parsed by natural language processing system 512.

In an embodiment, semantic relationship identifier 520 is a computer module that is configured to identify semantic relationships of recognized text elements (e.g., words, phrases) in documents. In an embodiment, semantic relationship identifier 520 determines functional dependencies between entities and other semantic relationships.

Consistent with various embodiments, the syntactic relationship identifier 522 is a computer module that is configured to identify syntactic relationships in a passage composed of tokens. In an embodiment, the syntactic relationship identifier 522 determines the grammatical structure of sentences. For example, which groups of words are associated as phrases and which word is the subject or object of a verb. In an embodiment, the syntactic relationship identifier 522 conforms to formal grammar.

In an embodiment, natural language processor 514 is a computer module that parses a document and generates corresponding data structures for one or more portions of the document. For example, in response to receiving an unstructured textual report at natural language processing system 512, natural language processor 514 could output parsed text elements from the report as data structures. In an embodiment, a parsed text element is represented in the form of a parse tree or other graph structure. To generate the parsed text element, natural language processor 514 triggers computer modules 516-522.

In an embodiment, the output of natural language processor 514 is used by search application 528 to perform a search of a set of (i.e., one or more) corpora to retrieve one or more features, or sets of features, and one or more associated criteria to send to an image processing system and to a comparator. A comparator is, for example, a statistical analyzer, such as statistical analyzer 450 of FIG. 4. In an embodiment, as used herein, a corpus refers to one or more data sources, such as data sources 524 of FIG. 5, or the various data sources described in FIG. 4. In an embodiment, data sources 524 includes data warehouses, information corpora, data models, and document repositories. In an embodiment, data sources 524 include an information corpus 526. In an embodiment, information corpus 526 enables data storage and retrieval. In an embodiment, information corpus 526 is a storage mechanism that houses a standardized, consistent, clean, and integrated list of features. In an embodiment, information corpus 526 also stores, for each feature, a list of associated suggestions. For example, information corpus 526 includes the types of player clusters (e.g., good, evil, skilled, novice, dedicated, recreational, etc.) and for each type of player cluster, associated suggestions (e.g., good module variation, evil module variation, skilled module variation, novice module variation, dedicated module variation, recreational module variation, etc.) is listed. Data is sourced from various operational systems. Data stored in information corpus 526 is structured in a way to specifically address reporting and analytic requirements. In an embodiment, information corpus 526 is a data repository, a relational database, triple store, or text index. In an embodiment, the report analysis module 530 is a computer module that identifies a feature and a suggestion by analyzing one or more unstructured textual reports (e.g., a player report). In an embodiment, report analysis module 530 includes a feature identifier 532 and a suggestion identifier 534. When an unstructured textual report is received by natural language processing system 512, report analysis module 530 is configured to analyze a report using natural language processing to identify one or more features. In an embodiment, report analysis module 530 first parses the report using natural language processor 514 and related subcomponents 516-522. After parsing the report, the feature identifier 532 identifies one or more features present in the report. This is done by, e.g., searching a dictionary (e.g., information corpus 526) using search application 528. In an embodiment, once a feature is identified, feature identifier 532 is configured to transmit the feature to an image processing system and/or to a statistical analyzer.

In an embodiment, suggestion identifier 534 identifies one or more suggestions (e.g., module suggestions) in one or more unstructured textual reports. This is done by using search application 528 to comb through the various data sources (e.g., information corpus 526 or the data sources discussed in FIG. 4) for information and/or reports regarding various module categories (e.g., evil campaign, good campaign, dedicated user, casual user, technical user, novice user, etc.) associated with a particular module. In an embodiment, the list of possible suggestions is predetermined and information related to the list of suggestions is populated as suggestion information is retrieved. In an embodiment, suggestion identifier 534 searches, using natural language processing, reports from the various data sources for terms in the list of suggestions. After identifying a list of suggestions, suggestion identifier 434 is configured to transmit the list of suggestions to a statistical analyzer.

Figure 6:
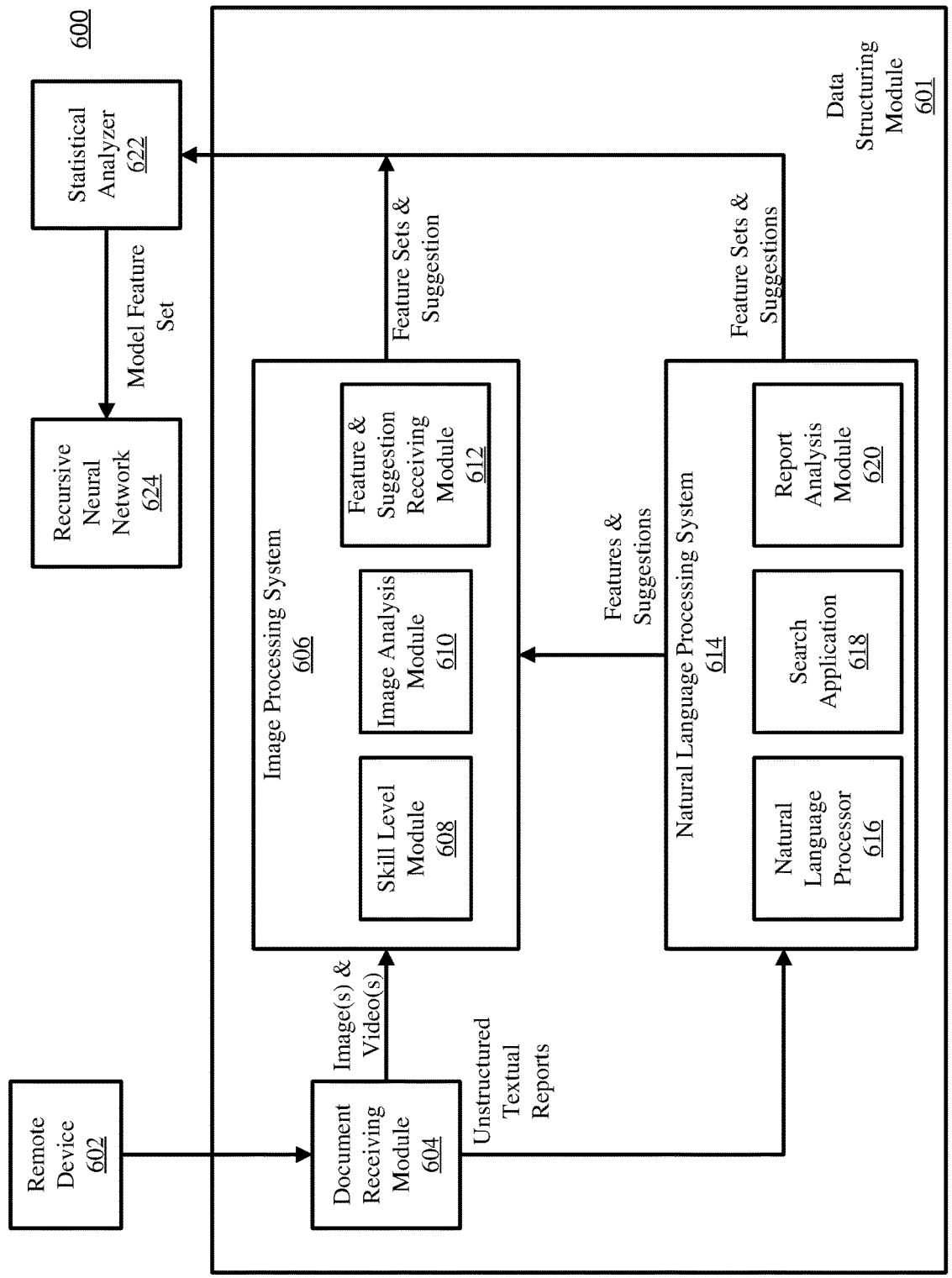
FIG. 6 depicts a block diagram in accordance with an exemplary embodiment of the present invention.

In an embodiment, referring to FIG. 6, shown is a block diagram of an example high level architecture of a system 600 for structuring unstructured textual and visual data, in accordance with embodiments of the present disclosure. In an embodiment, a data structuring module 601 and a statistical analyzer 622 includes the same characteristics as the data structuring module 420 and statistical analyzer 450 of FIG. 4, respectively. In an embodiment, a remote device 602 is substantially similar to one or more of the various data sources described in FIG. 4 and submits data to a document receiving module 604. The data includes one or more reports and one or more images or videos, such as computer diagrams. Document receiving module 604 is configured to receive the data and to send image(s) and video(s) to an image processing system 606 and report(s) to a natural language processing system 614. In an embodiment, some reports (e.g., performance reports, skill level reports, etc.) contain both images and text. In an embodiment, document receiving module 604 is configured to parse the data to separate the images and text prior to sending the data to image processing system 606 or to a natural language processing system 614.

In an embodiment, natural language processing system 614 includes the same modules and components as natural language processing system 512 (shown in FIG. 5). Natural language processing system 614 includes, e.g., a natural language processor 616, a search application 618, and a report analysis module 620. Natural language processing system 614 is configured to analyze the textual reports/data to identify one or more features and one or more suggestions relating to the feature(s). In an embodiment, after identifying a feature and a suggestion, natural language processing system 614 transmits the feature and suggestion to image processing system 606. In an embodiment, natural language processing system 614 also transmits both the feature and the suggestion to statistical analyzer 622. Report analysis module 620 is substantially similar to report analysis module 530 of FIG. 5.

In an embodiment, image processing system 606 includes, e.g., a skill level module 608, an image analysis module 610, and a feature & suggestion receiving module 612. Feature & suggestion receiving module 612 is configured to receive, from natural language processing system 614, identified features & suggestions determined by analyzing one or more unstructured textual reports that are related to images/videos received from document receiving module 604. In an embodiment, based on digital file formats (e.g., image file formats and video file formats), image processing system 606 determines with which image processing module (e.g., skill level module 608 or image analysis module 610) the system should analyze the image/video received from document receiving module 604.

In an embodiment, skill level module 608 is configured to recognize, parse, and output structured data representations of hand-drawn and computer-generated computer diagrams, such as, for example, computer performance graphs, screen shots, or diagrams in technician notes. In an embodiment, skill level module 608 interprets, a relative skill level of a user and the degree of information needed for each suggestion based on the user skill level information and the complexity of the suggestion based on relevant information (such as a catalog or a database containing task complexity).

In an embodiment, image analysis module 610 is configured to recognize computer diagrams, still images, or screen shots and output structured data representations (e.g., machine-readable data) of computer system-related data therein. For example, image analysis module 610 is configured to identify, from a still image, a video, or a single frame of a video feed, features and/or suggestions represented in the image or video (e.g., user/gamer performance graphs, game play videos, computer readouts, computer performance graphs on a screenshot, etc.).

In an embodiment, feature & suggestion receiving module 612 receives features and suggestions identified by report analysis module 620. Features and suggestions identified by report analysis module 620 are related to computer diagrams, images, screenshots or video processed by image processing system 606. For example, a screenshot or video of a performance graph in a task manager window. In an embodiment, document receiving module 604 parses the screenshot or video and sends the unstructured text portion to natural language processing system 614 and the graphs to image processing system 606. In an embodiment, portions of the data that do not need image processing are sent to statistical analyzer 622. Feature & suggestion receiving module 612 is configured to receive the features and suggestions identified from the textual portion of the image and combine them with the features and suggestions identified from the diagrams of that image to ensure that a robust set of features and suggestions for the particular module selection are identified and grouped together.

After image processing system 606 has analyzed any received images/diagrams/videos and natural language processing system 614 has analyzed any received unstructured textual reports for a given module, the complete feature set (e.g., all the feature sets related to a particular module) and suggestions are sent to statistical analyzer 622.

In an embodiment, as discussed herein, statistical analyzer 622 determines (e.g., using k-means or other statistical techniques) which features correlate to which suggestions. For example, if it is determined that gamer skill is below a certain threshold (e.g., below a certain level suggested by a software manufacture's suggestion) for a particular module. As a result, statistical analyzer 622 could suggest that an alternative module or module variation with a lower suggested user/gamer skill level.

In an embodiment, it is determined that features or characteristics of a user's or group of users' selections and not in accordance with the predicted module variations for the cluster. For example, data structuring module 601 could provide the relative module information to statistical analyzer 622, allowing statistical analyzer 622 to determine likely selections and their confidence values. Further, for example, data structuring module 601 could provide the relative which modules are appropriate.

After statistical analyzer 622 has digested a sufficient number of features and suggestions received from data structuring module 601 (e.g., the number of features and suggestions required for a robust and reliable gamer selection model, confidence values, and determining the detail level needed for each suggestion due to the user's skill), a model feature set is output to a recursive neural network 624. A model feature set includes features from a wide variety of modules and module suggestions for the modules. A model feature set is a static set of data, or it is dynamically updated "on-the-fly" as statistical analyzer 622 continuously receives additional features and suggestions from data structuring module 601.

In an embodiment, recursive neural network 624 is a multi-layer perceptron, a system of sigmoid neurons, a directed acyclic graph comprising a plurality of corelets, or any other structure/system capable of neural networking.

In an embodiment, recursive neural network 624 is used to conduct simulations of module selections wherein certain parameters of the simulation (e.g. certain features) are defined and/or manipulated by one or more users. Such simulations are used to determine that novel features (e.g., features not encountered or identified as part of suggested module variations from any reports from the various data sources) or uncommon features (e.g., features of module variations that are not usually suggested) would be appropriate for a user or cluster of users.

In an embodiment, recursive neural network 624 utilizes the model feature set to analyze real-time input received from the sensors of the computer system and determine which suggestion is most likely to provide a solution to the issue. In an embodiment, recursive neural network 624 determines that no solution would sufficiently resolve the issue. For example, recursive neural network 624 could determine that the current system could not handle the requisite memory and determine that the system is not capable of performing with the requested performance metrics.

Figure 7:
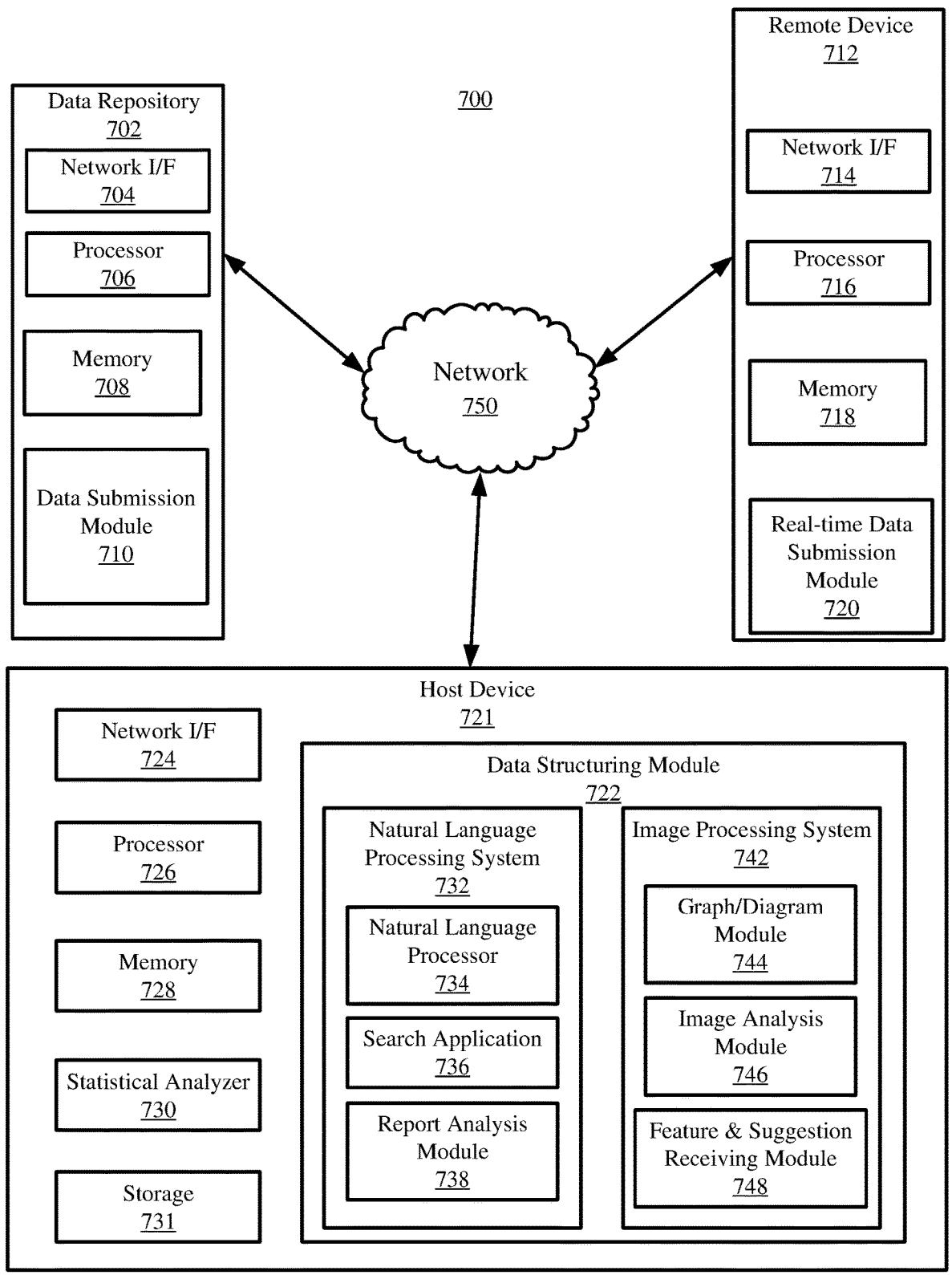
FIG. 7 depicts a block diagram in accordance with an exemplary embodiment of the present invention.

Referring now to FIG. 7, illustrated is a block diagram of an example computing environment 700 for creating computer module models and employing them to select modules to present to a user, in accordance with embodiments of the present disclosure. Consistent with various embodiments, the host device 721, the data repository 702, and a remote device 712 include, or are, computer systems. The host device 721, the data repository 702, and remote device 712 each includes one or more processors 726, 706, and 716 and one or more memories 728, 708, and 718, respectively. The host device 721, the data repository 702, and remote device 712 are configured to communicate with each other through an internal or external network interface 724, 704, and 714. In an embodiment, network interfaces 724, 704, and 714 are, e.g., modems or network interface cards. In an embodiment, host device 721, the data repository 702, and remote device 712 is equipped with a display or monitor (not pictured). Additionally, in an embodiment, the host device 721, the data repository 702, and remote device 712 include optional input devices (e.g., a keyboard, mouse, controller, scanner, or other input device), and/or any commercially available or custom software (e.g., browser software, communications software, server software, speech recognition software, natural language processing software, search engine and/or web crawling software, filter modules for filtering content based upon predefined parameters, etc.). In an embodiment, the host device 721, the data repository 702, and remote device 712 include or are servers, desktops, laptops, or hand-held devices.

In an embodiment, host device 721, the data repository 702, and remote device 712 is distant from each other and communicate over a network 750. In an embodiment, the host device 721 is a central hub from which data repository 702 and remote device 712 can establish a communication connection, such as in a client-server networking model. Alternatively, the host device 721, the data repository 702, and remote device 712 are configured in any other suitable networking relationship (e.g., in a peer-to-peer configuration or using any other network topology).

In an embodiment, data repository 702 is substantially similar to any or all of the various data sources discussed in FIG. 4, data sources 524 of FIG. 5, or remote device 602 of FIG. 6. In an embodiment, data repository 702 submits data, using data submission module 710, via network 750 to host device 721. In an embodiment, host device 721 then generates a user play/use model to be used in determining the modules that remote device 712 will execute.

In an embodiment, remote device 712 enables users to submit (or submits automatically with or without user input) electronic data (e.g., real-time computer system status) to the host device 721 in order to identify real-time features to utilize in a gamer/user model for determining gamer/user behaviors for remote device 712. For example, remote device 712 includes real-time data submission module 720 and a user interface (UI). The UI is any type of interface (e.g., command line prompts, menu screens, graphical user interfaces). The UI allows a user to interact with the host device 721 to submit, using the real-time data submission module 720, real-time features to the host device 721.

In an embodiment, the host device 721 includes a data structuring module 722. Data structuring module 722 is substantially similar to data structuring module 420 of FIG. 4, or data structuring module 601 of FIG. 6.

In an embodiment, the data structuring module 722 includes a natural language processing system 732, which is substantially similar to natural language processing system 512 of FIG. 5 or natural language processing system 614 of FIG. 6. Natural language processing system 732 includes a natural language processor 734, a search application 736, and a report analysis module 738. Natural language processor 734 includes numerous subcomponents, such as a tokenizer, a part-of-speech (POS) tagger, a semantic relationship identifier, and a syntactic relationship identifier.

The search application 736 is implemented using a conventional or other search engine, and is distributed across multiple computer systems. The search application 736 is configured to search one or more databases, as described herein, or other computer systems for content that is related to an electronic document (such as a performance report) submitted by, or retrieved from, a data repository 702. For example, the search application 736 is configured to search dictionaries, catalogs, and/or archived performance reports to help identify one or more features, and suggestions associated with the features, relating to the module selection. The report analysis module 738 is configured to analyze a performance report to identify likely modules and a suggestion (e.g., modules presented to the user). In an embodiment, the report analysis module 738 includes one or more modules or units, and utilizes the search application 736, to perform its functions (e.g., to identify a feature and a suggestion), as discussed in more detail in reference to FIGS. 4-5.

In an embodiment, the data structuring module 722 includes an image processing system 742. Image processing system 742 is substantially similar to image processing system 606 of FIG. 6. In an embodiment, image processing system considers features and suggestions identified by natural language processing system 732 (e.g., features and suggestions received by feature & suggestion receiving module 748) when identifying features and suggestions from an image, video, or diagram received or retrieved from data repository 702. In an embodiment, image processing system 742 utilizes one or more models, modules, or units to perform its functions (e.g., to analyze an image/video/diagram and identify feature sets and suggestions). For example, image processing system 742 could include one or more image processing modules that are configured to identify specific features and suggestions in an player report, game play report, application use report, screen shot, recording of a display, etc. The image processing modules includes, by way of example, a graph diagram module 744 to analyze computer performance diagrams and graphs to identify features and suggestions. As another example, image processing system 742 includes an image analysis module 746 to identify features and suggestions from screen shots, videos, computer diagrams, and real time performance graphics. In an embodiment, the image processing modules are implemented as software modules. In an embodiment, graph diagram module 744 and image analysis module 746 are combined into a single software module or divided among the several components of the host device 721 or the data structuring module 722.

In an embodiment, image processing system 742 includes a feature & suggestion receiving module 748. The feature & suggestion receiving module 748 is substantially similar to feature & suggestion receiving module 612 of FIG. 6.

In an embodiment, the host device 721 includes a statistical analyzer 730. The statistical analyzer 730 is configured to receive features and suggestions from natural language processing system 732 and an image analysis from image processing system 742 (e.g., the statistical analyzer 730 is substantially similar to the statistical analyzer 450 of FIG. 4).

In an embodiment, the data structuring module 722 has an optical character recognition (OCR) module (not pictured). In an embodiment, the OCR module is configured to receive an analog format of an unstructured textual report sent from a data repository 702 and perform optical character recognition (or a related process) on the report to convert it into machine-encoded text so that natural language processing system 732 performs natural language processing on the report. For example, the data repository 702 could transmit an image of a scanned user communication to the host device. The OCR module could convert the image into machine-encoded text, and then the converted report is sent to natural language processing system 732 for analysis. In an embodiment, the OCR module is a subcomponent of natural language processing system 732. In other embodiments, the OCR module is a standalone module within the host device 721 or data structuring module 722. In still other embodiments, the OCR module is located within the data repository 702 and performs OCR on the unstructured, analog textual reports before they are sent to the host device 721 or data structuring module 722.

In an embodiment, host device 721 further includes storage 731 for storing features, suggestions, and computer system module selection models. Computer system module selection models are loaded into active memory (e.g., memory 728 or memory 718) to process real-time input (e.g., data received from real-time data submission module 720) to determine a set of module suggestions that a remote device 712 should execute in light of real-time features (e.g., current memory usage).

While FIG. 7 illustrates a computing environment 700 with a single host device 721, a single data repository 702, and a single remote device 712, suitable computing environments for implementing embodiments of this disclosure includes any number of host devices, data repositories, and remote devices (such as a gaming console). In an embodiment, the various models, modules, systems, and components discussed in relation to FIG. 7 exist, if at all, across a plurality of host devices, data repositories, and remote devices. For example, some embodiments include two host devices and multiple data repositories. The two host devices are communicatively coupled using any suitable communications connection (e.g., using a WAN, a LAN, a wired connection, an intranet, or the Internet). The first host device includes a natural language processing system configured to receive and analyze unstructured textual reports, and the second host device includes an image processing system configured to receive and analyze diagrams, images, or screenshots.

In an embodiment, it is noted that FIG. 7 is intended to depict the representative major components of an exemplary computing environment 700. In an embodiment, however, individual components have greater or lesser complexity than as represented in FIG. 7, components other than or in addition to those shown in FIG. 7 are present, and the number, type, and configuration of such components may vary.

Figure 8:
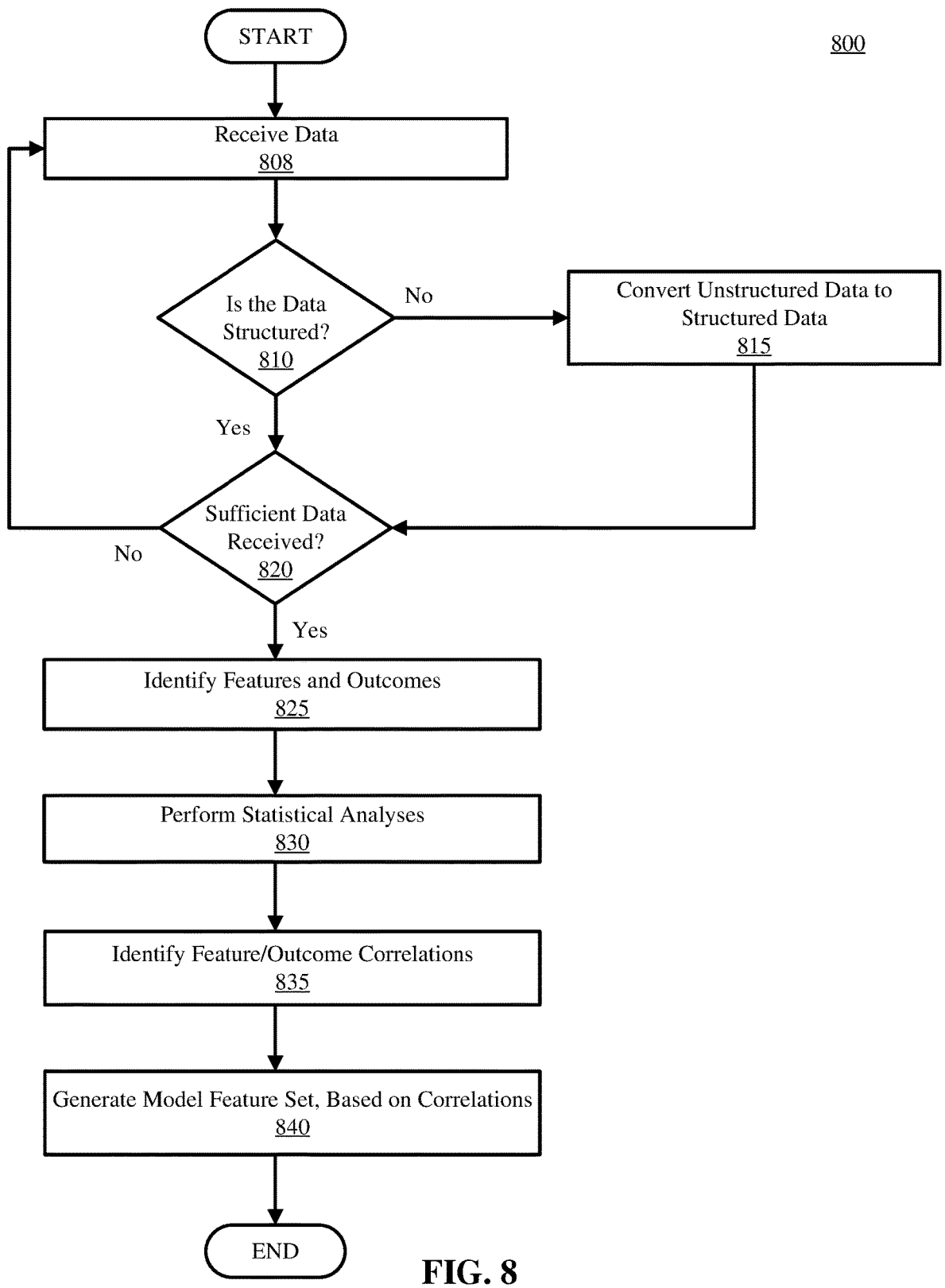
FIG. 8 depicts a flow diagram in accordance with an exemplary embodiment of the present invention.

In an embodiment, referring now to FIG. 8, shown is a method 800 for generating a model feature set, in accordance with embodiments of the present disclosure. At 808, data is received. Data includes, for example, data from any of the sources discussed in relation to FIGS. 4-5. Data could be received in response to a query (e.g., "pulled") of a data source, or data could be received automatically or at specific intervals from a data source (e.g., "pushed").

In an embodiment, at 810, it is determined whether the received data is structured. Structured data includes machine-readable data or any data that does not require further processing to be utilized in a statistical analysis or the generation of a module selection behavior model.

In an embodiment, if it is determined, at 810, that received data is not structured, unstructured data is converted into structured data at 815. Techniques for converting unstructured data into structured data are discussed in detail in the descriptions of FIGS. 4-6 and includes, for example, natural language processing techniques, image processing techniques, optical character recognition, gaming performance analysis, etc. In an embodiment, if it is determined, at 810, that received data is structured, the method proceeds to 820.

In an embodiment, at 820, it is determined if sufficient data has been received. For example, in order to build robust and effective models, a certain volume of data (e.g., a certain number of data entries for a number of data points in a statistical analysis) or a particular sample size is required. A threshold for determining whether a sufficient amount of data has been received is employed, and the threshold is based on user input or standards for statistical analyses that are well-known in the art.

In an embodiment, if, at 820, it is determined that sufficient data has been received, features and outcomes are identified at 825. Features include the conditions that lead or contribute to the occurrence of a module selection. Outcomes include the results of previous module selections. In an embodiment, if, at 820, it is determined that sufficient data has not been received, the user is queried for more information and the additional data is received at 808.

In an embodiment, at 830, statistical analyses are performed to characterize the features and outcomes. Techniques for performing statistical analyses (e.g., clustering techniques), are described in greater detail herein.

In an embodiment, at 835, correlations between the features and the outcomes are identified, as described herein.

In an embodiment, at 840, a model feature set is generated, based on the correlations identified. For example, as described herein, features (e.g., user skill, user preferences, choices of user's friends, etc.) could correlate to module selection likelihood. A model feature set includes rules, algorithms, neural network configurations/parameters, etc. representing these correlations. As such, a model feature set is utilized to perform, for example, a computer simulation of a module selection according to a list of selected features or to determine which modules should be presented to maximize the likelihood of the user making or enjoying the predicted module selection, given a set of unalterable real-time features (e.g., user/gamer choices).

In an embodiment, a model feature set is dynamic. In other words, the model feature set may update "on-the-fly" as more data is received and processed to produce more accurate correlation representations from the increased sample size.

Computer System

Figure 9:
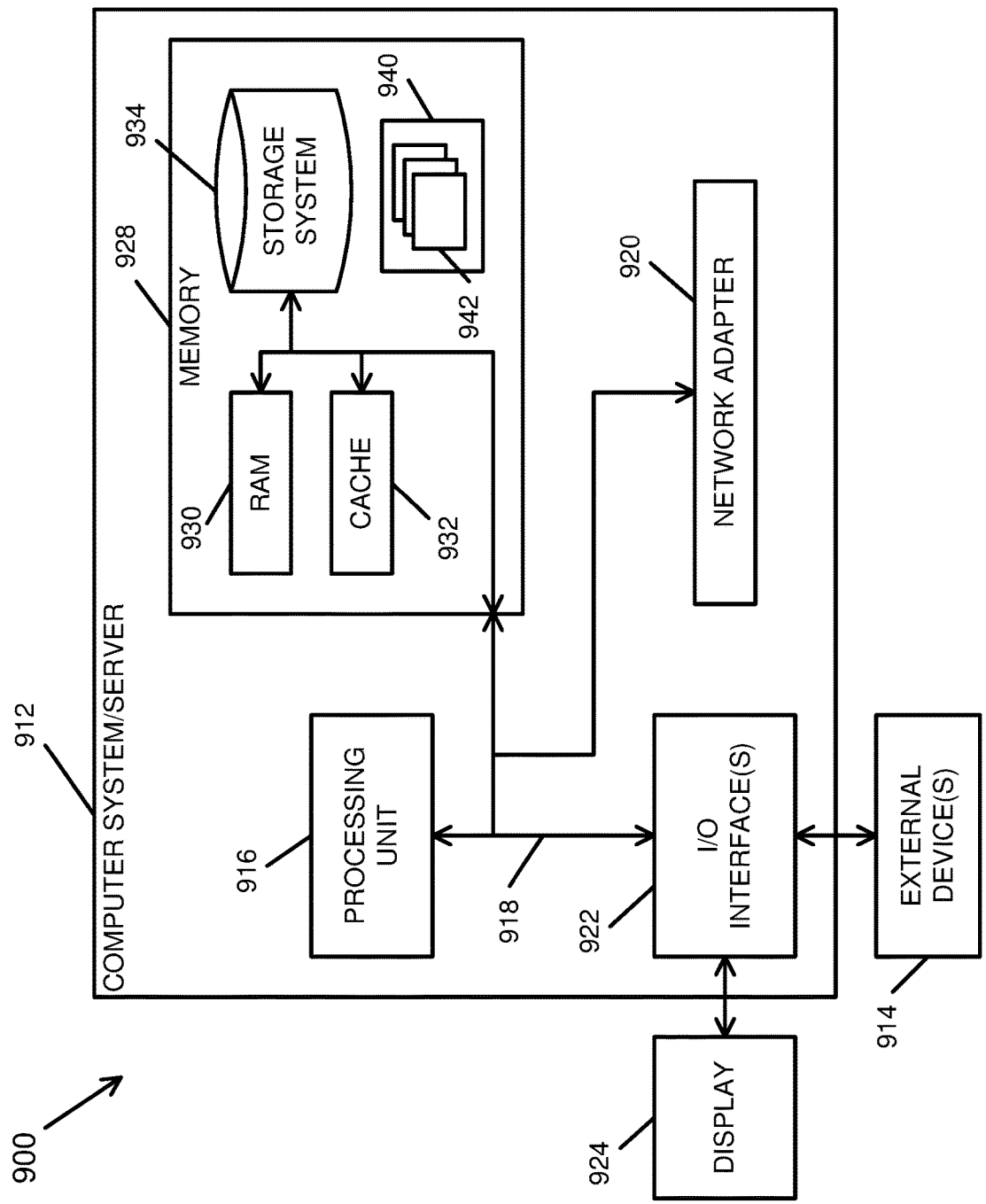
FIG. 9 depicts a computer system in accordance with an exemplary embodiment of the present invention.

In an exemplary embodiment, the computer system is a computer system 900 as shown in FIG. 9. Computer system 900 is only one example of a computer system and is not intended to suggest any limitation as to the scope of use or functionality of embodiments of the present invention. Regardless, computer system 900 is capable of being implemented to perform and/or performing any of the functionality/operations of the present invention.

Computer system 900 includes a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 912 may be described in the general context of computer system-executable instructions, such as program modules, being executed by a computer system. Generally, program modules may include routines, programs, objects, components, logic, and/or data structures that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in computer system 900 is shown in the form of a general-purpose computing device. The components of computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 912 typically includes a variety of computer system readable media. Such media may be any available media that is accessible by computer system/server 912, and includes both volatile and non-volatile media, removable and non-removable media.

System memory 928 can include computer system readable media in the form of volatile memory, such as random access memory (RAM) 930 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions/operations of embodiments of the invention.

Program/utility 940, having a set (at least one) of program modules 942, may be stored in memory 928 by way of example, and not limitation. Exemplary program modules 942 may include an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the present invention.

Computer system/server 912 may also communicate with one or more external devices 914 such as a keyboard, a pointing device, a display 924, one or more devices that enable a user to interact with computer system/server 912, and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
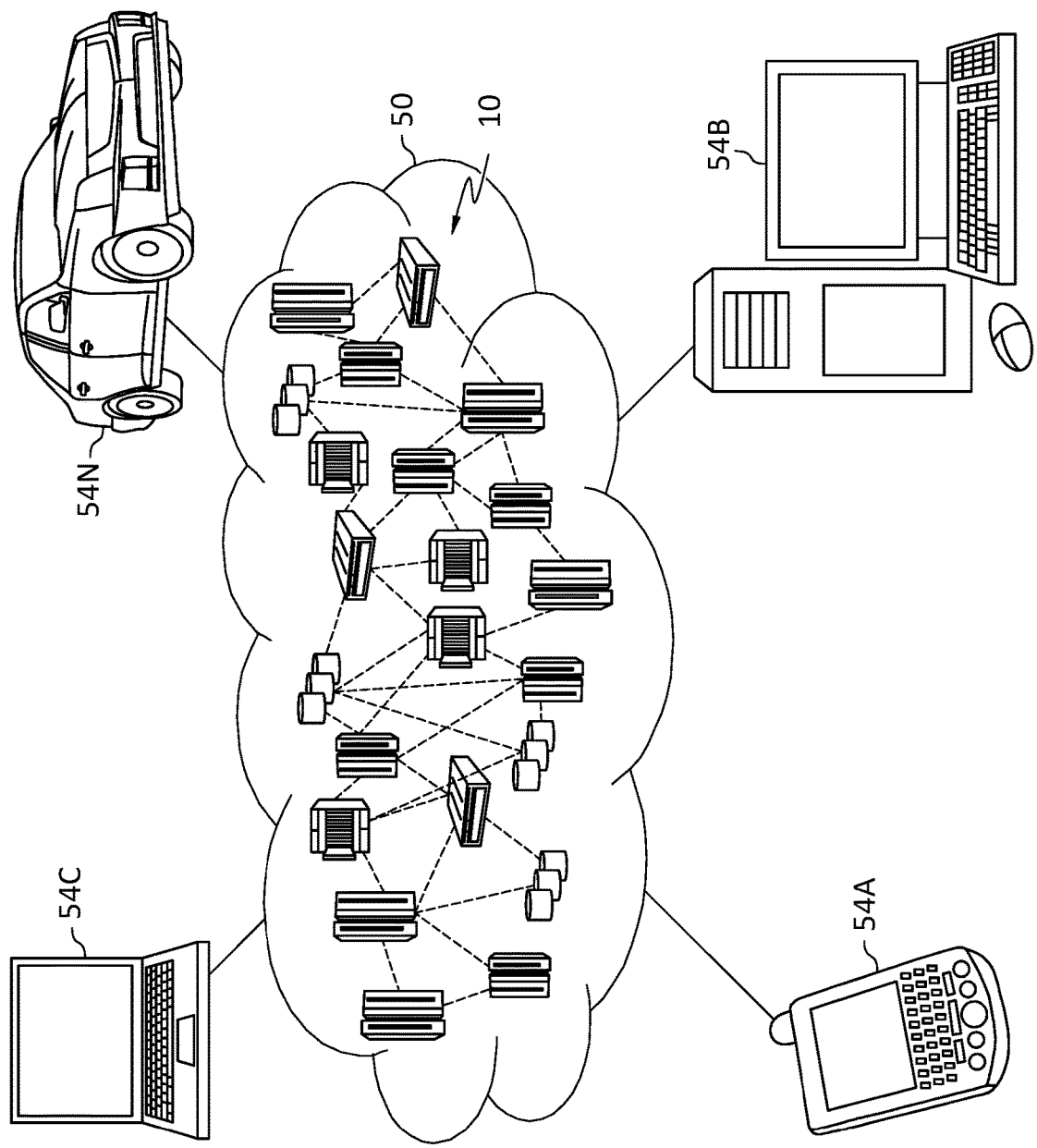
FIG. 10 depicts a cloud computing environment according to various embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
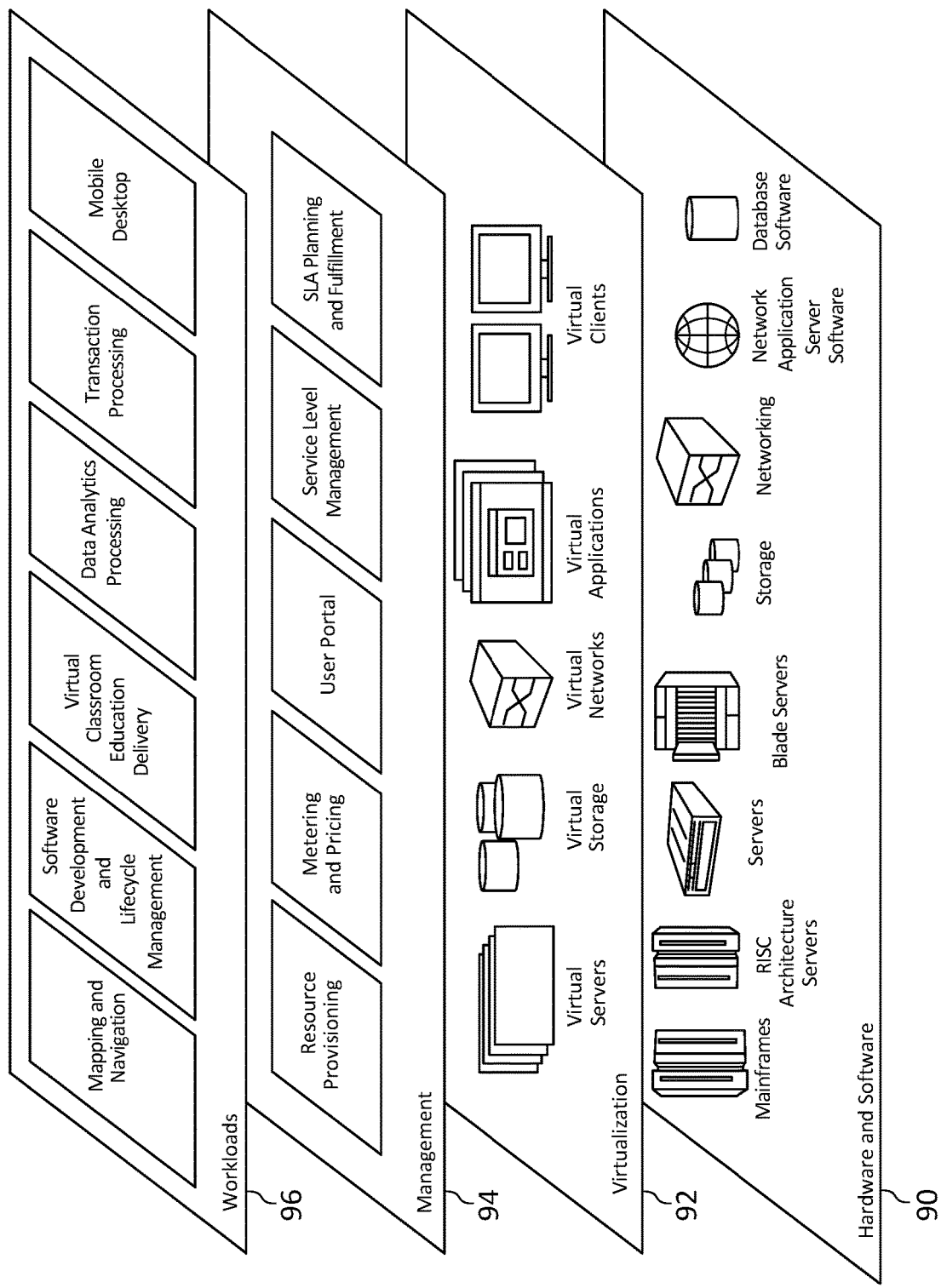
FIG. 11 depicts abstraction model layers according to various embodiments of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 90 includes hardware and software components. Examples of hardware components include: mainframes; RISC (Reduced Instruction Set Computer) architecture based servers; storage devices; networks and networking components. In some embodiments, software components include network application server software.

Virtualization layer 92 provides an abstraction layer from which the following examples of virtual entities may be provided: virtual servers; virtual storage; virtual networks, including virtual private networks; virtual applications and operating systems; and virtual clients.

In one example, management layer 94 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 96 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
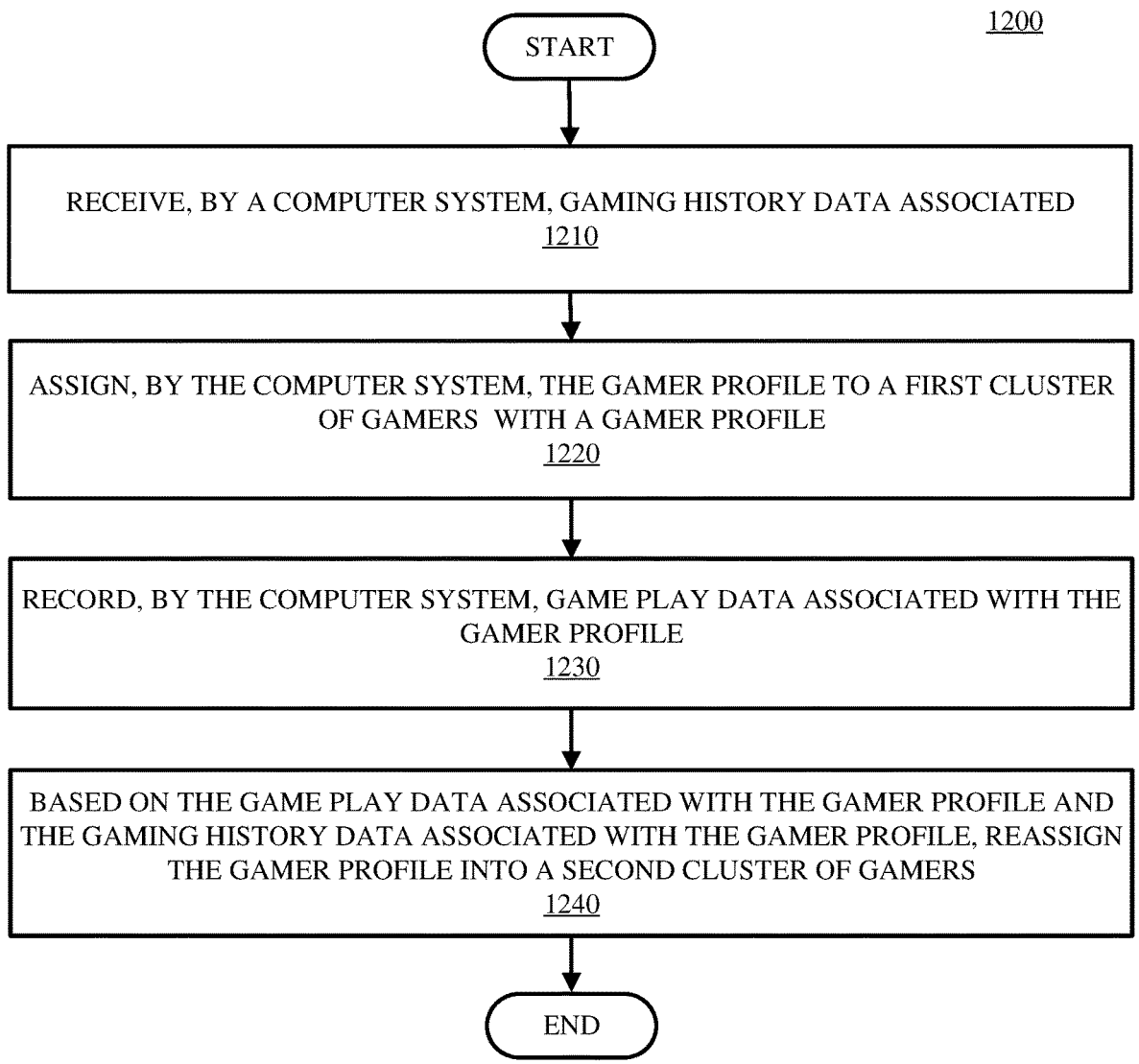
FIG. 12 depicts a flow diagram in accordance with an exemplary embodiment of the present invention.

Referring to FIG. 12, in an embodiment, the method 1200, includes an operation 1210 of receiving, by a computer system, gaming history data associated with a gamer profile, an operation 1220 of assigning, by the computer system, the gamer profile to a first cluster of gamers, an operation 1230 of recording, by the computer system, game play data associated with the gamer profile, and an operation 1240 of based on the game play data associated with the gamer profile and the gaming history data associated with the gamer profile, reassigning the gamer profile into a second cluster of gamers.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

The invention claimed is:

1. A method comprising:
receiving, by a computer system, gaming history data associated with a gamer profile;
providing, based on the gaming history data, a selection of two or more clusters of gamers to a gamer;
receiving a choice of a first cluster of gamers from the gamer;
developing a psychosocial profile for the gamer using a known history of choices, preferences, and engagement for the gamer;
capturing gamer experiences with personality profile automated measurements (P-PAM),
wherein capturing gamer experiences comprises identifying top design modules the gamer found most engaging;
assigning, by the computer system, the gamer profile to the first cluster of gamers based on the choice;
recording, by the computer system, game play data associated with the gamer profile, wherein the game play data comprises in game choices of the gamer;
retrieving, by the computer system, in game choices from the game play data;
identifying a predicted path for the gamer based on the psychosocial profile and the first gamer cluster, wherein the predicted path comprises one or more predicted actions by the gamer;
identifying, by the computer system based on the in game choices, deviations by the gamer from the predicted path of the first cluster of gamers that indicate low engagement, wherein the deviations includes one or more actions taken by the gamer that were not on the predicted path;
dynamically validating the psychosocial profile with the P-PAM,
wherein the P-Pam provides real-time validation of the computer system's assumptions for the gamer,
wherein P-Pam provides real-time reassignment to accommodate a changing psychosocial profile of the gamer;
comparing an execution of the gamer and interest of the gamer in various design modules against those of an assigned module for different clusters of gamers;
determining, based on the identified deviations, the dynamic validation, and the comparison, that gamer engagement is low for the first cluster of garners;
correlating, by the computer system based on a determination that the in game choices by the gamer have a high degree of correlation with a second cluster of gamers, the deviations to a solution; and
based on the correlating, P-PAM providing real-time reassignment of the gamer profile into a second cluster of gamers.

2. The method of claim 1 further comprising:
receiving, by the computer system, gaming history data associated with one or more gamer profiles assigned to the first cluster of gamers;
based on the gaming history data associated with the one or more gamer profiles assigned to the first cluster of gamers, selecting, by the computer system, an initial gaming module among a plurality of initial gaming modules;
recording, by the computer system, the game play data associated with the one or more gamer profiles;
based on the game play data associated with the one or more gamer profiles and the gaming history data associated with the one or more gamer profiles assigned to the first cluster of gamers, identifying, by the computer system, one or more candidate gaming modules from the plurality of gaming modules; and
displaying, by the computer system, choices of a plurality of the one or more candidate modules to one or more gamers associated with the one or more gamer profiles assigned to the first cluster of gamers on a display logically connected to the computer system.

3. The method of claim 2 wherein the selecting comprises:
displaying choices of the plurality of initial gaming modules on the display logically connected to the computer system; and
receiving a selection of the initial gaming module from the choices of the plurality of initial gaming modules.

4. The method of claim 2, further comprising receiving, by the computer system, a choice of one of the one or more candidate gaming modules.

5. The method of claim 1 further comprising assigning, by the computer system, gaming tasks to the gamer profile based on the assigning.

6. The method of claim 1, wherein the possible solution is selected from the group consisting of: directing the gamer to a new gamer cluster with a different difficulty, directing the gamer to the new gamer cluster with a different module design, and directing the gamer to a new gamer cluster with a different approach to achieving a task.

7. The method of claim 1, wherein the gamer engagement is determined with feedback from game play.

8. The method of claim 7, wherein the feedback is selected form the group consisting of: continuing to use the game, a long break from use of a game, a feedback mechanism, dialog with other gamer.

9. The method of claim 1,
wherein the first cluster of gamers has a predicted choice path; and
wherein the determination that the gamer engagement is low includes determining that the in game choices of the gamer do not match the predicted choice path.

10. A system comprising:
a memory; and
a processor in communication with the memory, the processor configured to perform a method comprising:
receive gaming history data associated with a gamer profile;
provide, based on the gaming history data, a selection of two or more gamer clusters to a gamer;
receive a choice of a first cluster of gamers from the gamer;
develop a psychosocial profile for the gamer using a known history of choices, preferences, and engagement for the gamer;
capture gamer experiences with personality profile automated measurements (P-PAM), wherein capturing gamer experiences comprises identifying top design modules the gamer found most engaging;
assign the gamer profile to the first cluster of gamers based on the choice;
record game play data associated with the gamer profile, wherein the game play data comprises in game choices of the gamer;
retrieve, by the system, identify, by the system based on the in game choices, a first set of features of the first cluster of gamers that may indicate low engagement;
identify a predicted path for the gamer based on the psychosocial profile and the first gamer cluster, wherein the predicted path comprises one or more predicted actions by the gamer;
identify, by the computer system based on the in game choices, deviations by the gamer from the predicted path of the first cluster of gamers that indicate low engagement, wherein the deviations includes one or more actions taken by the gamer that were not on the predicted path;
dynamically validate the psychosocial profile with the P-PAM,
wherein the P-Pam provides real-time validation of the processor's assumptions for the gamer,
wherein P-Pam provides real-time reassignment to accommodate a changing psychosocial profile of the gamer;
compare an execution of the gamer and interest of the gamer in various design modules against those of an assigned module for different clusters of gamers;
determine, based on the identified first set of features, the dynamic validation, and the comparison, that gamer engagement is low for the first cluster of gamers;
correlate, by the system based on a determination that the in game choices by the gamer have a high degree of correlation with a second cluster of gamers, the deviations to a solution; and
based on the correlating, P-PAM providing real-time reassignment of the gamer profile into the second cluster of gamers.

11. The system of claim 10 further comprising:
receive gaming history data associated with one or more gamer profiles assigned to the first cluster of gamers;
based on the gaming history data associated with the one or more gamer profiles assigned to the first cluster of gamers, select an initial gaming module among a plurality of initial gaming modules;
record the game play data associated with the one or more gamer profiles;
based on the game play data associated with the one or more gamer profiles and the gaming history data associated with the one or more gamer profiles assigned to the first cluster of gamers, identify one or more candidate gaming modules from the plurality of gaming modules; and
display choices of a plurality of the one or more candidate modules to one or more gamers associated with the one or more gamer profiles assigned to the first cluster of gamers on a display logically connected to the system.

12. The system of claim 11 wherein the selecting comprises:
displaying choices of the plurality of initial gaming modules on a display logically connected to the system; and
receiving a selection of the initial gaming module from the choices of the plurality of initial gaming modules.

13. The system of claim 11, further comprising receive a choice of one of the one or more candidate gaming modules.

14. The system of claim 10, wherein the reassigning comprises:
defining the second cluster; and
assigning the gamer profile to the second cluster.

15. The system of claim 10, wherein the game play data describes gaming preferences of the gamer profile.

16. The system of claim 10 further comprising assign gaming tasks to the gamer profile based on the assigning.

17. A computer program product comprising a computer readable storage medium having program instructions embodied therewith, the program instructions executable by a processor to cause the processor to perform a method comprising:
receiving, by a computer system, gaming history data associated with a gamer profile;
providing, based on the gaming history data, a selection of two or more clusters of gamers to a gamer;
receiving a choice of a first cluster of gamers from the gamer;
developing a psychosocial profile for the gamer using a known history of choices, preferences, and engagement for the gamer;
capturing gamer experiences with personality profile automated measurements (P-PAM), wherein capturing gamer experiences comprises identifying top design modules the gamer found most engaging;
assigning, by the computer system, the gamer profile to the first cluster of gamers based on the choice;
recording, by the computer system, game play data associated with the gamer profile, wherein the game play data comprises in game choices of the gamer;
retrieving, by the computer system, in game choices from the game play data;
identifying a predicted path for the gamer based on the psychosocial profile and the first gamer cluster, wherein the predicted path comprises one or more predicted actions by the gamer;
identifying, by the computer system based on the in game choices, deviations by the gamer from the predicted path of the first cluster of gamers that indicate low engagement, wherein the deviations includes one or more actions taken by the gamer that were not on the predicted path;
dynamically validating the psychosocial profile with the P-PAM,
wherein the P-Pam provides real-time validation of the processor's assumptions for the gamer,
wherein P-Pam provides real-time reassignment to accommodate a changing psychosocial profile of the gamer;
comparing an execution of the gamer and interest of the gamer in various design modules against those of an assigned module for different clusters of gamers;
determining, based on the identified deviations, the dynamic validation, and the comparison, that gamer engagement is low for the first cluster of garners;
correlating, by the computer system based on a determination that the in game choices by the gamer have a high degree of correlation with a second cluster of gamers, the deviations to a possible solution; and
based on the correlating, reassigning the gamer profile into the second cluster of gamers, wherein the reassigning addresses the possible solution.

18. The computer program product of claim 17 further comprising:
receiving, by the computer system, gaming history data associated with one or more gamer profiles assigned to the first cluster of gamers;
based on the gaming history data associated with the one or more gamer profiles assigned to the first cluster of gamers, selecting, by the computer system, an initial gaming module among a plurality of initial gaming modules;
recording, by the computer system, game play data associated with the one or more gamer profiles;
based on the game play data associated with the one or more gamer profiles and the gaming history data associated with the one or more gamer profiles assigned to the first cluster of gamers, identifying, by the computer system, one or more candidate gaming modules from the plurality of gaming modules; and
displaying, by the computer system, choices of a plurality of the one or more candidate modules to one or more gamers associated with the one or more gamer profiles assigned to the first cluster of gamers on a display logically connected to the computer system.

19. The computer program product of claim 18 wherein the selecting comprises:
displaying choices of the plurality of initial gaming modules on the display logically connected to the computer system; and
receiving a selection of the initial gaming module from the choices of the plurality of initial gaming modules.

* * * * *